United States Patent
Chen et al.

(10) Patent No.: US 7,426,161 B2
(45) Date of Patent: *Sep. 16, 2008

(54) OPTICAL RECORDING METHOD AND APPARATUS WITH DIFFERENT RECORDING RATES

(75) Inventors: Chih-Yuan Chen, Lujhou (TW); Shou-Ren Tsai, Chu Pei (TW); Jyh-Shin Pan, Chu Tung Chen (TW)

(73) Assignee: MediaTek, Inc., Hsin Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/584,109

(22) Filed: Oct. 19, 2006

(65) Prior Publication Data

US 2007/0036046 A1 Feb. 15, 2007

Related U.S. Application Data

(63) Continuation of application No. 11/218,445, filed on Sep. 2, 2005, now Pat. No. 7,142,490, which is a continuation of application No. 10/214,715, filed on Aug. 9, 2002, now Pat. No. 7,035,179.

(51) Int. Cl.
*G11B 5/09* (2006.01)

(52) U.S. Cl. ............... 369/47.36; 369/47.28; 369/47.1; 369/59.14

(58) Field of Classification Search .............. None
See application file for complete search history.

(56) References Cited

U.S. PATENT DOCUMENTS

| | | | |
|---|---|---|---|
| 5,444,687 A * | 8/1995 | Okumura | ............ 369/47.19 |
| 5,805,548 A | 9/1998 | Ishihara et al. | |
| 5,870,363 A | 2/1999 | Sun et al. | |
| 6,400,667 B1 | 6/2002 | Utsumi et al. | |
| 6,564,009 B2 | 5/2003 | Owa et al. | |
| 6,665,243 B2 | 12/2003 | Kelly et al. | |
| 6,704,253 B2 | 3/2004 | Tanaka | |
| 6,967,910 B2 | 11/2005 | Yamamoto | |
| 2002/0039339 A1 | 4/2002 | Shiozaki et al. | |
| 2003/0165093 A1 | 9/2003 | Tanaka | |

* cited by examiner

*Primary Examiner*—Muhammad Edun
(74) *Attorney, Agent, or Firm*—Andrew D. Fortney

(57) ABSTRACT

An optical recording method and apparatus with different recording rates are provided for effectively increasing the average recording rate. The optical recording method includes the steps of: controlling a recording rate with a constant linear velocity (CLV) control mode; recording data; judging whether the recording rate has to be increased according to a rotating speed of a spindle motor or a recording position; and performing a process for changing the rotating speed if the recording rate is increased, and continuing recording data at the same recording rate if the recording rate is not increased. The step for changing the rotating speed includes the steps of: pausing recording data; registering a paused zone of a disc; determining a new rotating speed of the spindle motor, and driving the spindle motor at the new rotating speed; and linking recording zones to continue recording data at a new recording rate from the paused zone, when the rotating speed of the spindle motor is stable. Consequently, the invention can optimize the overall average recording rate by effectively utilizing the maximum rotating speed of the spindle motor in conjunction with the maximum recording rate.

18 Claims, 7 Drawing Sheets

OPTICAL RECORDING METHOD AND APPARATUS WITH DIFFERENT RECORDING RATES

CROSS REFERENCE TO RELATED APPLICATIONS

This is a continuation of U.S. application Ser. No. 11/218,445 that was filed on Sep. 2, 2005 now U.S. Pat. No. 7,142,490, which is a continuation of U.S. application Ser. No. 10/214,715 that was filed on Aug. 9, 2002 and now is patented as U.S. Pat. No. 7,035,179, and are included herein by reference.

BACKGROUND OF THE INVENTION

1. Field of the Invention

The invention relates to an optical recording method and apparatus, and in particular to an optical recording method and apparatus for linking paused zones under different recording rates or control modes by a linking method.

2. Description of the Related Art

The data recording modes for the CD-R and CD-RW may be divided into a constant linear velocity (CLV) recording mode and a constant angle velocity (CAV) recording mode. FIG. 1 shows the relationship among the CD's rotating speed, radius of recording position, and recording rate under the CLV mode. FIG. 1(A) is a graph showing the relationship between the CD's rotating speed and the radius of recording position, while FIG. 1(B) is a graph showing the relationship between the recording rate and the radius of recording position. It can be clearly understood form FIG. 1(A) that for keeping a constant tangential velocity at a recording position, the motor rotates at high speed when recording data at the inner tracks, and rotates at low speed when recording data at the outer tracks. The rotating speed decreases from the inner tracks to the outer tracks. Because the tangential velocity of the CD is constant, the recording rate is always kept constant, as shown in FIG. 1(B). However, due to the limitation of maximum rotating speed of the spindle motor, the recording rate cannot achieve the highest recording rate of the system, thereby elongating the recording time.

FIG. 2 shows the relationship among the CD's rotating speed, radius of recording position, and recording rate under the CAV mode. FIG. 2(A) is a graph showing the relationship between the CD's rotating speed and the radius of recording position, while FIG. 2(B) is a graph showing the relationship between the recording rate and the radius of recording position. It can be clearly understood form FIG. 2(A) that the rotating speed at any position of the CD is always the same under the CAV mode. However, the tangential velocity of the CD varies with the radius variation of the CD, as shown in FIG. 2(B). That is, the tangential velocity is slower at a position closer to the inner tracks, and its corresponding recording rate is also slower. Consequently, in order to keep the recording rate at the outer tracks not exceeding the maximum recording rate of the system, the spindle motor cannot reach the maximum rotating speed. Therefore, the average recording rate for recording the whole CD cannot be high.

SUMMARY OF THE INVENTION

In view of the above-mentioned problems, it is therefore an object of the invention to provide an optical recording method and apparatus, which can vary the recording rate and increase the average recording rate.

Another object of the invention is to provide an optical recording method and apparatus, which may switch the control modes between the CAV mode and the CLV mode.

To achieve the above-mentioned objects, an optical recording method with different recording rates includes the steps of: controlling a recording rate with a constant linear velocity (CLV) control mode; recording data; judging whether the recording rate has to be increased according to a rotating speed of a spindle motor or a recording position; and performing a process for changing the rotating speed if the recording rate is increased, and continuing recording data at the same recording rate if the recording rate is not increased. The step for changing the rotating speed includes the steps of: pausing recording data; registering a recording paused zone of a disc when the recording pauses; determining a new rotating speed of the spindle motor, and driving the spindle motor at the new rotating speed; and linking recording zones to continue recording data at a new recording rate from the paused zone, when the rotating speed of the spindle motor is stable.

To achieve the above-mentioned objects, an optical recording method with different recording rates includes the steps of: controlling a recording rate with a constant angle velocity (CAV) control mode; recording data; judging whether the control mode has to be changed to a constant linear velocity (CLV) control mode according to a recording rate or a recording position; performing a process for changing the control mode if the control mode is changed to the CLV control mode, and continuing recording data at the same angle velocity if the control mode is not changed to the CLV control mode. The step for changing the control mode includes the steps of: pausing recording data; registering a recording paused zone of a disc when the recording pauses; determining a new rotating speed of the spindle motor, and driving the spindle motor at the new rotating speed; and linking recording zones to continue recording data under a CLV control mode from the paused zone, when the rotating speed of the spindle motor is stable.

To achieve the above-mentioned objects, an optical recording apparatus with different recording rates includes an optical head for acquiring optical signals, a pre-amplifier for amplifying output signals from the optical head, a recording circuit for controlling operations of data recording, a servo controller for controlling rotation of the spindle motor, an ATIP decoder, a spindle motor driver, a rotating speed detector for the spindle motor, a data encoder/decoder, a buffer memory controller, a buffer memory, and a host interface. The device is characterized in that it further includes: a switch detector for judging whether the recording rate has to be changed according to a rotating speed of the motor or a recording position, and determining a new recording rate; and a linking controller for registering a paused zone, when the recording rate is changed, waiting for a stable rotating speed, finding out the paused zone, and continuing recording with a new recording rate.

Consequently, the invention may optimize the overall average recording rate by effectively utilizing the maximum rotating speed of the spindle motor in conjunction with the CD's maximum recording rate.

DETAILED DESCRIPTION OF THE INVENTION

The optical recording method and apparatus with different recording rates of the invention will be described with reference to the accompanying drawings.

Figure 1A:
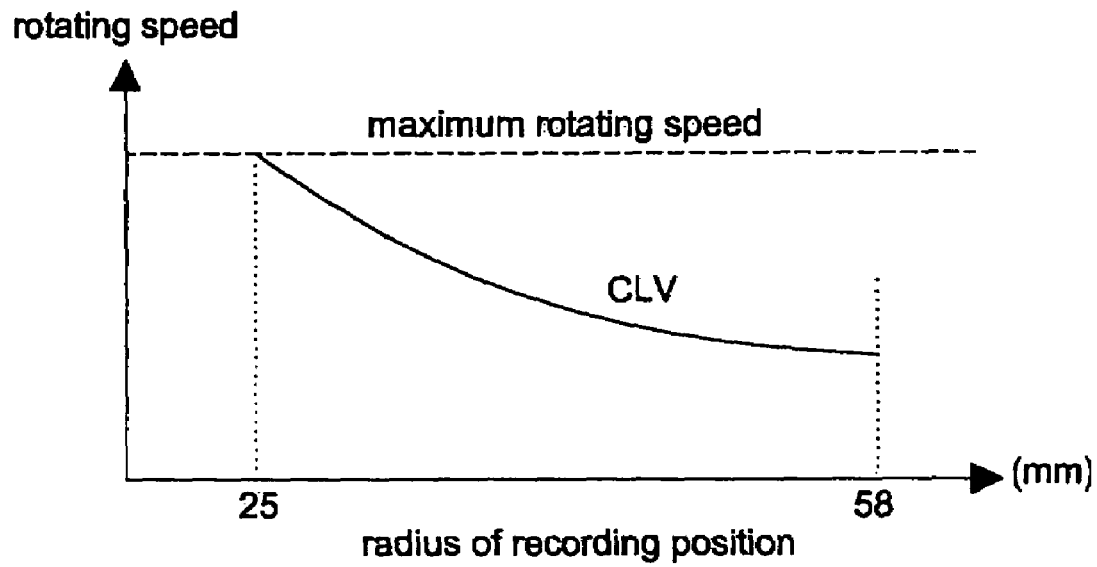
FIG. 1(A) is a graph showing the relationship between the CD's rotating speed and the radius of recording position under the CLV mode.
Figure 1B:
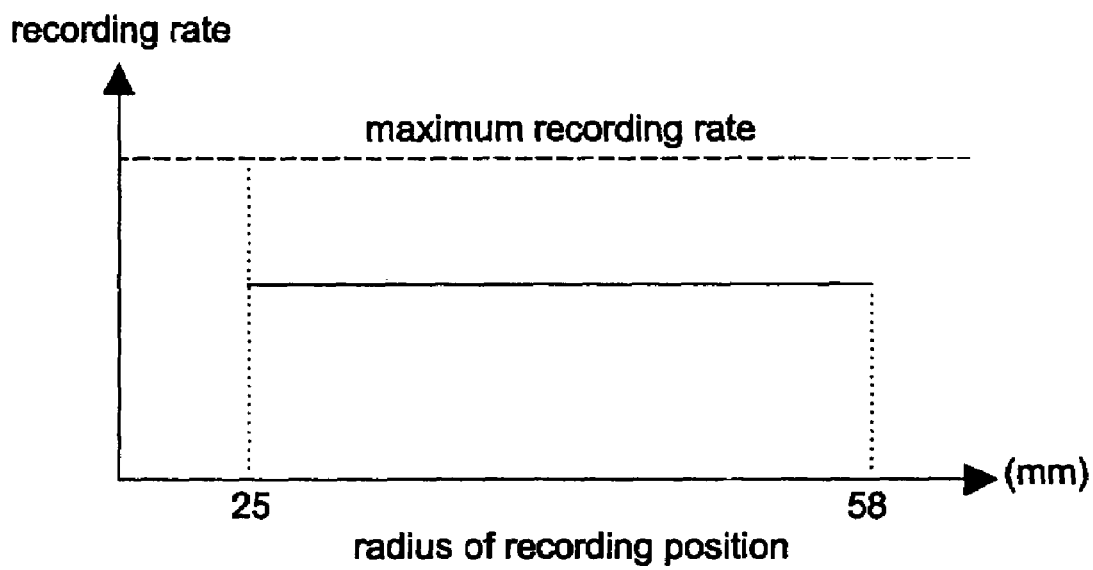
FIG. 1(B) is a graph showing the relationship between the recording rate and the radius of recording position under the CLV mode.
Figure 2A:
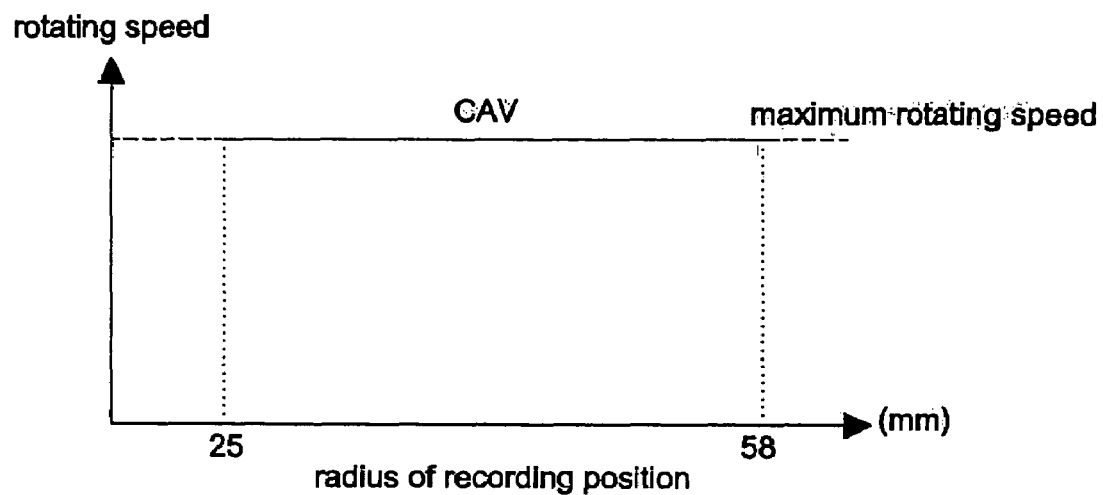
FIG. 2(A) is a graph showing the relationship between the CD's rotating speed and the radius of recording position under the CAV mode.
Figure 2B:
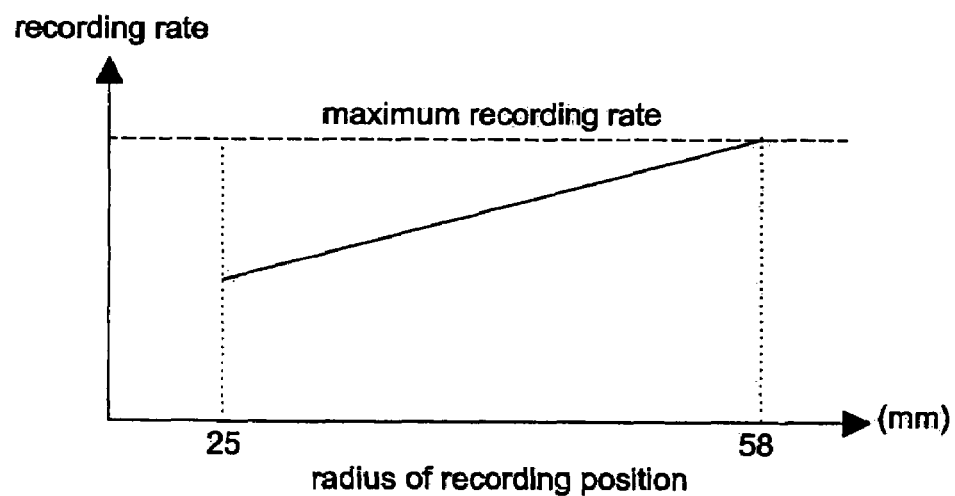
FIG. 2(B) is a graph showing the relationship between the recording rate and the radius of recording position under the CAV mode.
Figure 3A:
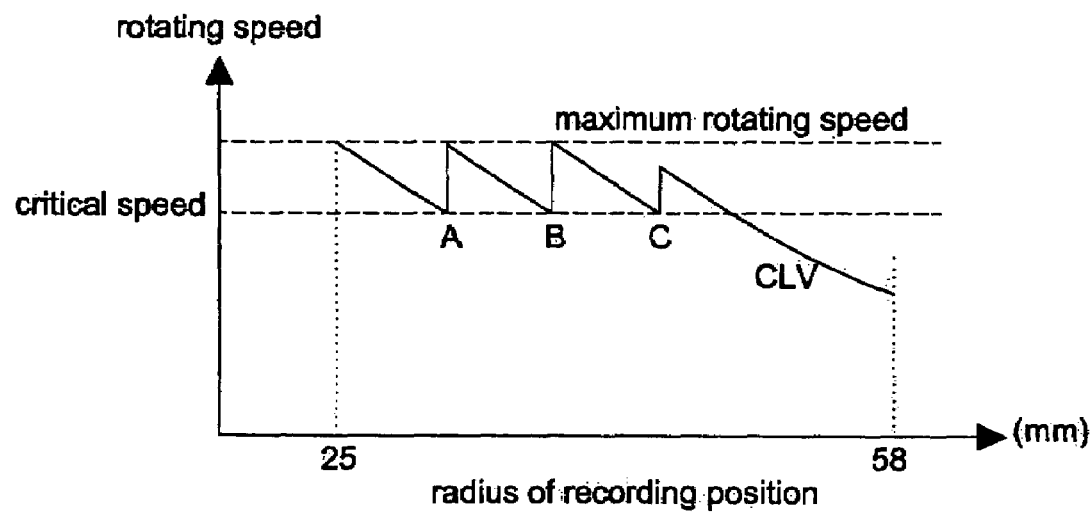
FIG. 3(A) is a graph showing the relationship between the CD's rotating speed and the radius of recording position under the variable CLV mode of the control method for CD recording of the present invention.
Figure 3B:
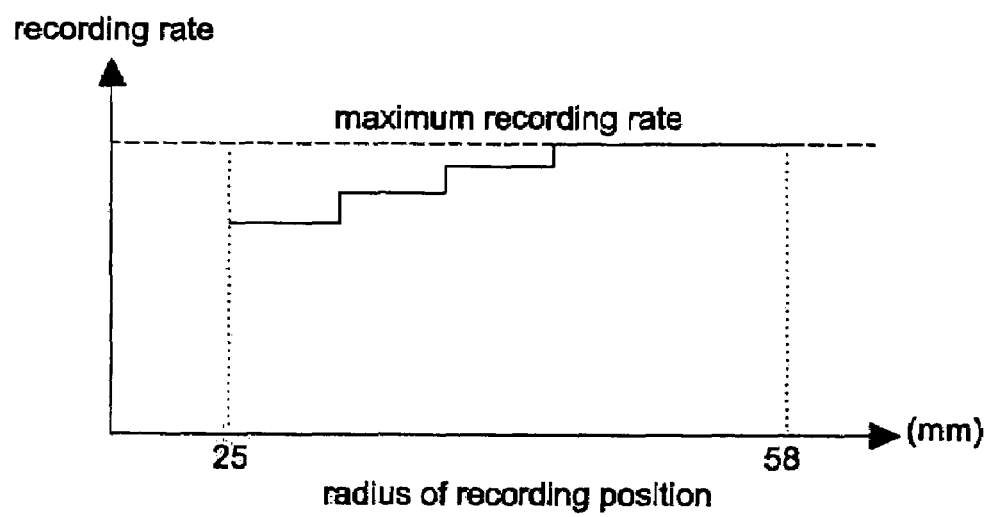
FIG. 3(B) is a graph showing the relationship between the recording rate and the radius of recording position under the variable CLV mode of the control method for CD recording of the present invention.

FIG. 3 shows the relationship among the CD's rotating speed, radius of recording position, and recording rate under the variable CLV mode of the control method for CD recording of the present invention. FIG. 3(A) is a graph showing the relationship between the CD's rotating speed and the radius of recording position, while FIG. 3(B) is a graph showing the relationship between the recording rate and the radius of recording position. Although the CD recording control method of the invention is controlled under the CLV mode, the linear velocity can be adjusted according to the recording position. As shown in FIG. 3, due to the limitation of the maximum rotating speed of the spindle motor, the linear velocity is the minimum, and thus the recording rate is the minimum when recording data at the inner tracks of the CD. However, when the rotating speed of the spindle motor is smaller than a critical speed, the system speeds the rotating speed of the spindle motor up to the maximum rotating speed. Thus, the data is recorded in a higher speed under the CLV mode, and the recording rate is relatively increased. As a result, as long as the recording rate does not exceed the maximum recording rate of the system, the rotating speed of the spindle motor may be increased to the maximum rotating speed when the rotating speed is less than a critical speed. Since the recording rate gets higher at a position closer to the outer tracks, as shown in FIG. 3(B), the average recording rate is higher than that in the conventional system running under a single recording rate.

Figure 4A:
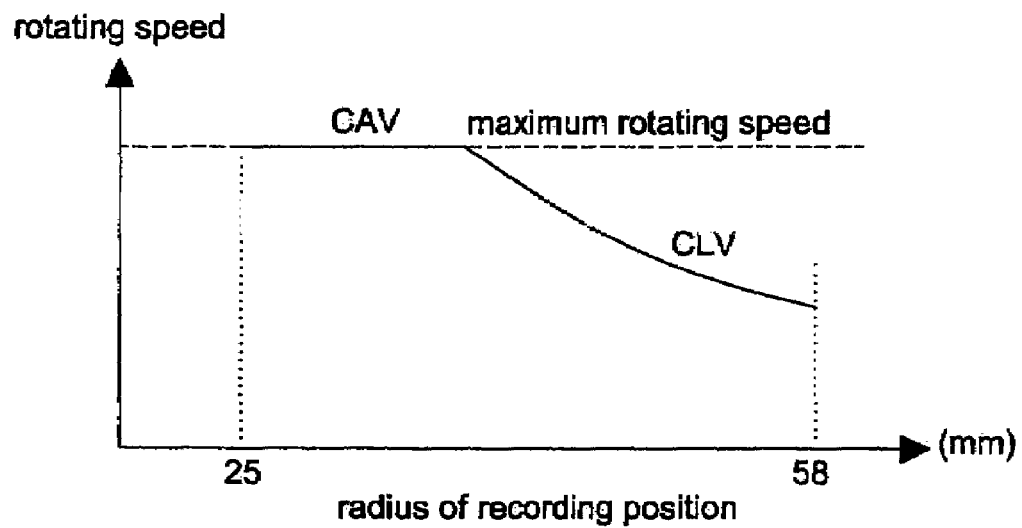
FIG. 4(A) is a graph showing the relationship between the CD's rotating speed and the radius of recording position under the CAV to CLV modes of the control method for CD recording of the invention.
Figure 4B:
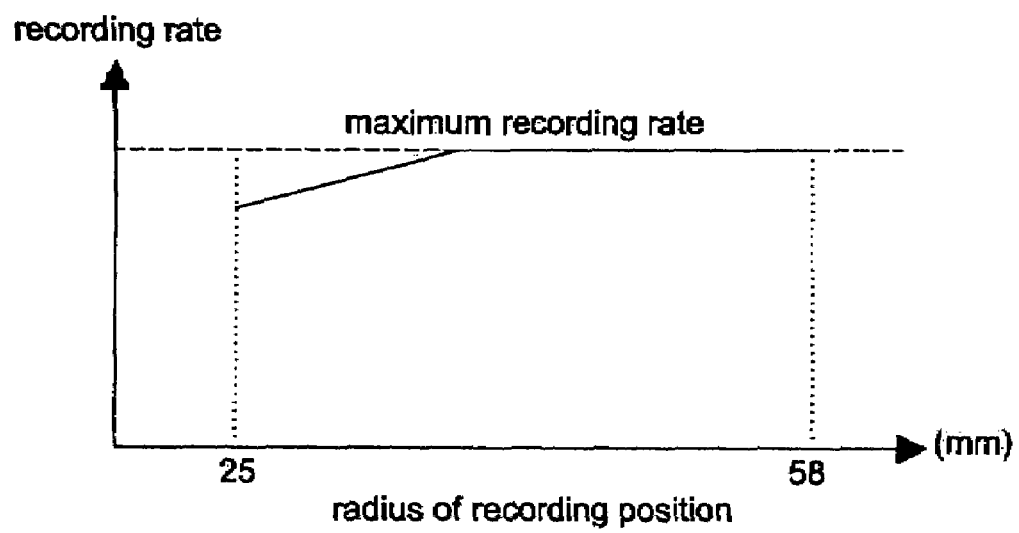
FIG. 4(B) is a graph showing the relationship between the recording rate and the radius of recording position under the CAV to CLV modes of the control method for CD recording of the invention.

FIG. 4 shows the relationship among the CD's rotating speed, radius of recording position, and recording rate under the CAV to CLV modes of the control method for CD recording of the invention. FIG. 4(A) is a graph showing the relationship between the CD's rotating speed and the radius of recording position, while FIG. 4(B) is a graph showing the relationship between the recording rate and the radius of recording position. As shown in FIG. 4(A), the control method for CD recording of the invention runs under the CAV mode when recording data at the inner tracks of the CD, and under the CLV mode when recording data at the outer tracks of the CD. Because two control modes are used in the control method for CD recording, the recording rate is not limited to the maximum recording rate at the outermost tracks of the CD but to the maximum recording rate of the mode switching point under the front-stage CAV mode. Thus, the angle velocity may be increased, and the recording rate can also be correspondingly increased. The CD recording is controlled under the CLV mode after the switching point, so the recording rate may be always kept at the maximum recording rate. Therefore, the average recording rate, as shown in FIG. 4(B), is higher than that in the conventional system running under a signal angle velocity.

Figure 5:
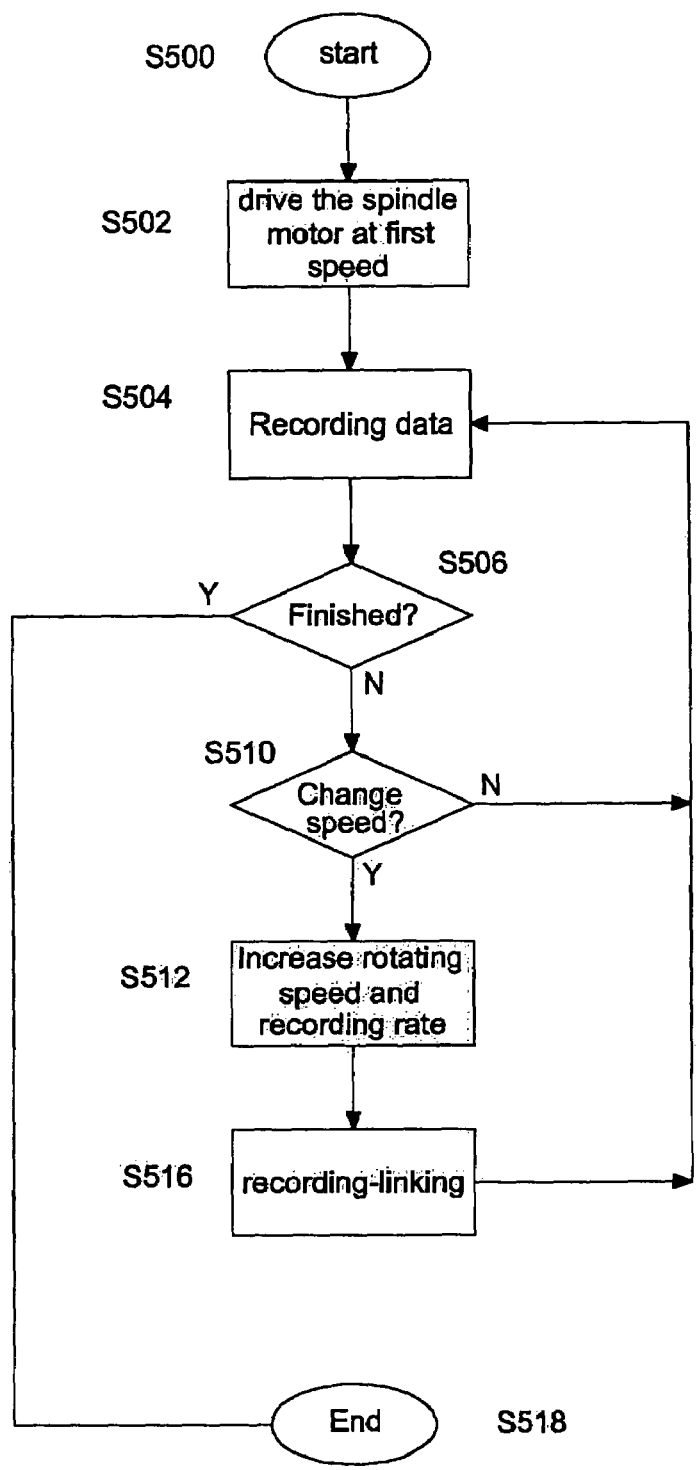
FIG. 5 shows a control flow chart of a variable CLV mode of the present invention.

FIG. 5 shows a control flow chart of a variable CLV mode. The chart is shown for illustrating how to vary the constant linear velocity by detecting rotating speed. The steps are described as follows.

Step S500: Start recording the CD.

Step S502: Drive the spindle motor with a CLV control mode, and determine an initial recording rate. The initial recording rate may be determined according to a position of starting recording. That is, the initial recording rate is determined according to the ATIP information for starting recording.

Step S504: Recording data.

Step S506: Judge whether the data recording has been finished. If yes, the process goes to step S518. If not, the process goes to a next step.

Step S510: Judge whether the recording rate has to be increased. If yes, the process goes to a next step. If not, the process goes to step S504.

Step S512: Increase the rotating speed of the spindle motor and also the recording rate, and to determine the linear velocity of recording according to the limitations of the maximum rotating speed of the spindle motor and the maximum recording rate of the CD. Then, the process goes to a next step.

Step S516: Execute a recording-linking procedure, and then jump back to step S504.

Step S518: End.

In step S510, there are several methods for judging whether the recording rate should be increased. For example, the judgment can be done according to whether the motor rotating speed is lower than a critical speed, or according to the recording position.

If the judgment is done according to the motor rotating speed, the increase of the linear velocity in step 512 is determined according to the limitations of maximum rotating speed of the spindle motor and the CD's maximum recording rate. The way for the determination is as follows. When the spindle motor rotates at the maximum rotating speed and if the linear velocity does not exceed the limitation of the CD's maximum recording rate, the linear velocity serves as the one after being adjusted, as shown at the positions of A and B in FIG. 3(A), for example. On the other hand, when the spindle motor rotates at the maximum rotating speed and if the linear velocity exceeds the limitation of the CD's maximum recording rate, the CD's maximum recording rate serves as the linear velocity after being adjusted, as shown at the position of C in FIG. 3(A), for example. When the recording rate is the CD's maximum recording rate, the recording rate will no longer be increased.

If the judgment is done according to the recording position, the motor rotating speed and the recording rate after being adjusted may be determined according to a look-up table of the recording position (ATIP information) versus the rotating speed in step S512. Therefore, the method of the invention may optimize the overall average recording rate by effectively utilizing the maximum rotating speed of the spindle motor in conjunction with the limitation of the CD's maximum recording rate.

Figure 6:
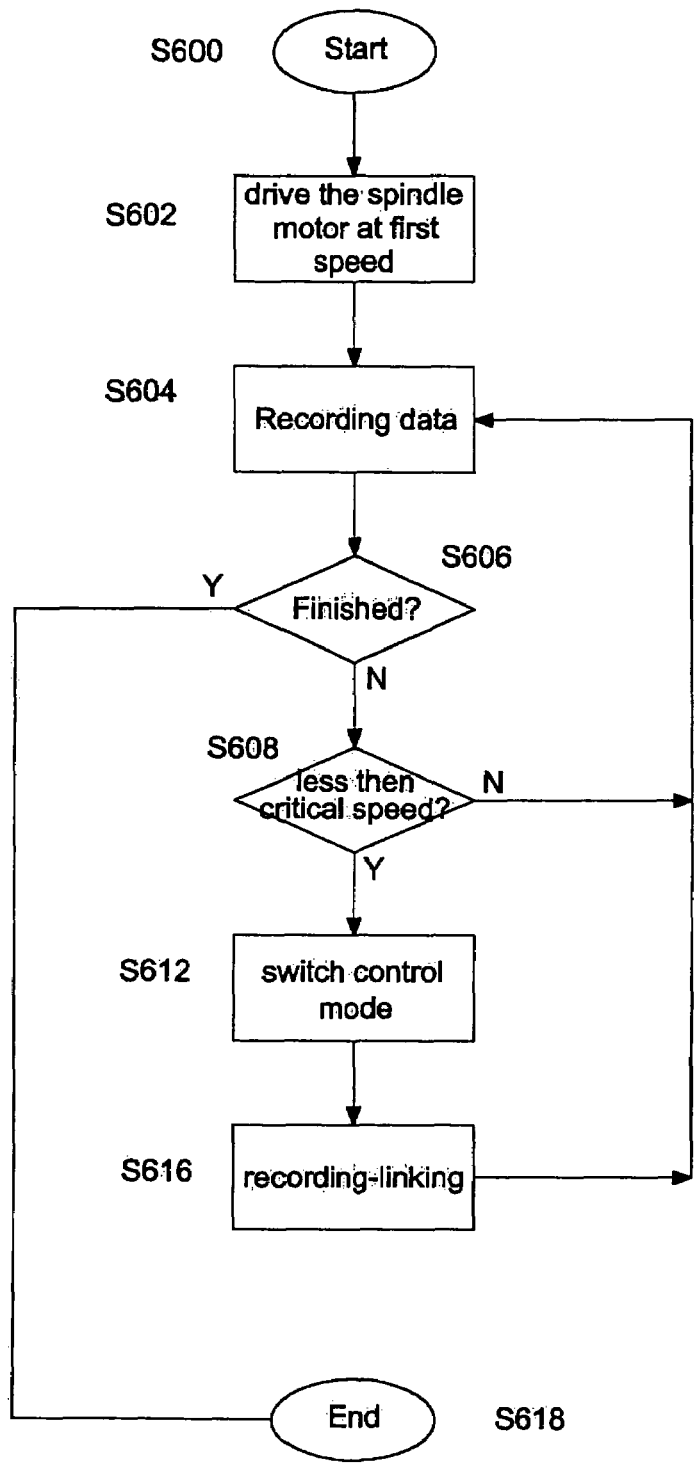
FIG. 6 shows a control flow chart of CAV to CLV modes of the present invention.

FIG. 6 shows a control flow chart of CAV to CLV modes. The drawing is shown to illustrate how to optimize the overall average recording rate by changing the CAV control mode to the CLV control mode according to the rotating speed detection. The steps are described as follows.

Step S600: Start recording the CD.

Step S602: Drive the spindle motor with a CAV control mode, and determine an initial recording rate.

Step S604: Record data.

Step S606: Judge whether the data recording has been finished. If yes, the process goes to step S618. If not, the process goes to a next step.

Step S608: Detects whether the recording rate reaches the CD's maximum recording rate. If the recording rate is lower than the CD's maximum recording rate, the process goes to step S604. Otherwise, the process goes to a next step.

Step S612: Switch to a CLV control mode.

Step S616: Execute a recording-linking procedure, and then jump back to step S604.

Step S618: End.

In step S602, the initial angle velocity may be the maximum rotating speed of the spindle motor, and may also be the speed lower than the maximum rotating speed of the spindle motor. In addition, the initial angle velocity may also be determined according to the recording position in conjunction with the look-up table.

In step S608, the time for switching or changing the control modes is determined according to the limitations of the current recording rate and the CD's maximum recording rate. The determination is made as follows. When the current recording rate does not exceed the CD's maximum recording rate, the CAV control mode is maintained. When the current recording rate equals to the CD's maximum recording rate, the mode is switched to the CLV control mode with the rotating speed of the spindle motor unchanged. Of course, the switching time of the recording rate in step S608 may also be other recording rate lower than the CD's maximum recording rate, but not limited to the CD's maximum recording rate.

In addition, whether the control mode should be switched in step S608 may also be judged according to the recording position (ATIP information). That is, when the recording position reaches a predetermined position, the mode is switched to the CLV control mode without detecting the rotating speed and the recording rate. Therefore, the method of the invention may optimize the overall average recording rate by effectively utilizing the maximum rotating speed of the spindle motor in conjunction with the limitation of the CD's maximum recording rate.

Figure 7:
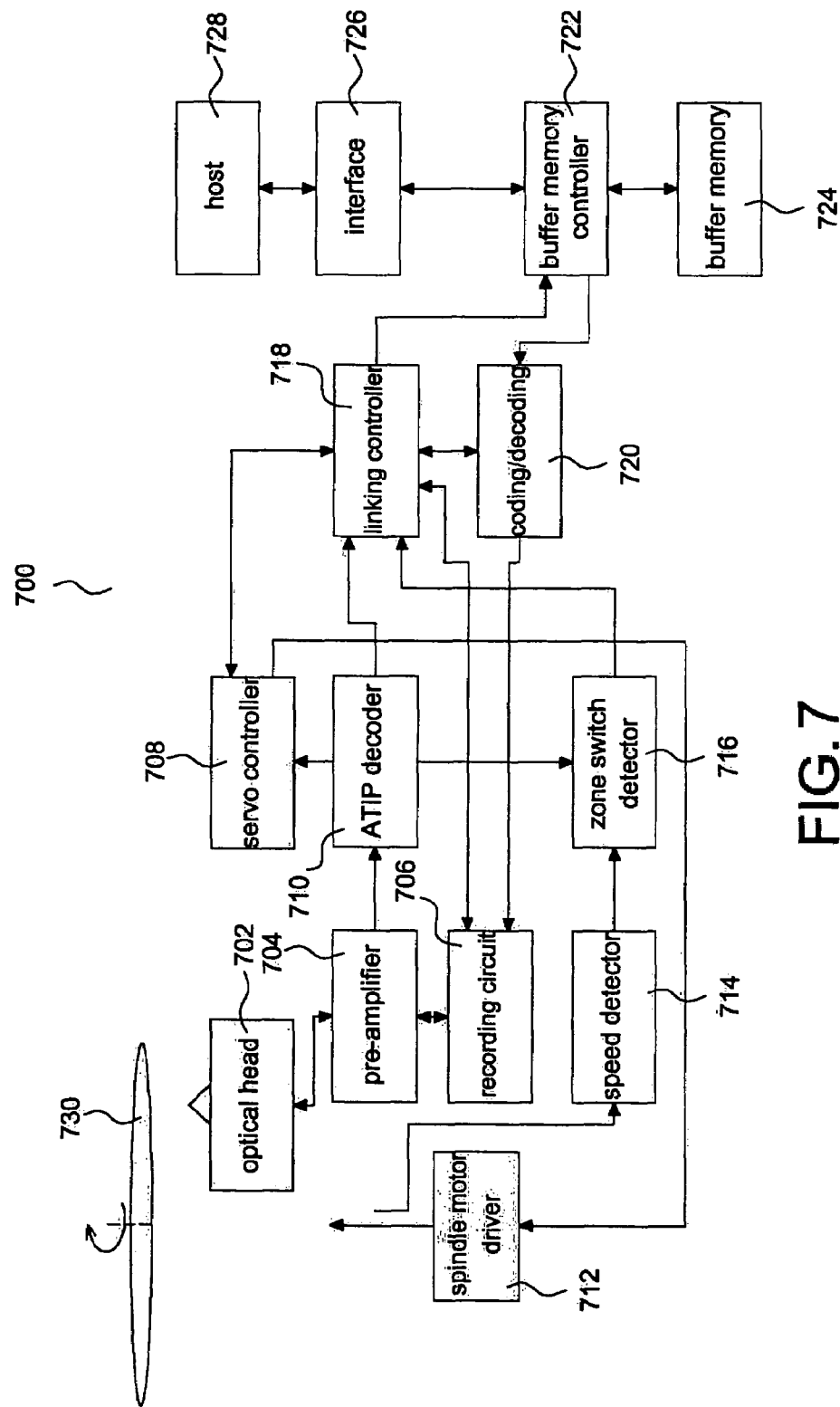
FIG. 7 shows a control device for CD recording with different recording rates of the present invention.

FIG. 7 shows the block diagram of the optical recording apparatus with different recording rates of the invention. As shown in FIG. 7, the optical recording apparatus 700 includes general elements of a typical CD recording control device. The elements includes, for example, an optical pickup head 702, a pre-amplifier 704, a recording circuit 706, a servo controller 708, an ATIP decoder 710, a spindle motor driver 712, a rotating speed detector 714, a buffer memory controller 722, a buffer memory 724, and a host interface 726. In addition, the optical recording apparatus 700 further includes a zone switch detector 716 and a linking controller 718. The optical recording apparatus 700 controls the rotation of the CD 730 by the spindle motor driver 712. The optical recording apparatus 700 is connected to an external host 728 through the host interface 726.

The optical recording apparatus 700 of the invention utilizes the zone switch detector 716 to detect the timing and zone for switching, and informs the linking controller 718 to control the linking after the switching when the control mode or recording rate needs to be switched. The main function of the zone switch detector 716 is to detect the timing needed for switching the control mode or for increasing the recording rate and inform the linking controller 718 according to the control flow of FIGS. 5 and 6. The linking controller 718 calculates the CD's rotating speed and recording rate, and outputs a control signal to the servo controller 708 so as to control the CD's rotating speed through the spindle motor driver 712. When the rotating of the CD 730 is stable, the linking controller 718 performs the linking control to find the linking zone. Then, the recording process with a new control mode or a new recording rate continues. The method for the linking controller 718 to find the linking zone and the method for linking control are disclosed in Applicant's Taiwan Patent Application No. 89122511, filed on Oct. 25, 2000, entitled "Recording method of connection linking for recordable CD and a driving device using the same", the disclosure of which is hereby incorporated by reference.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. An optical recording method, comprising:
    recording data at a recording rate within a constant linear velocity (CLV) control mode;
    determining whether a rotating speed of a spindle motor is a critical speed or less, a predetermined maximum speed, or between the critical speed and the predetermined maximum speed; and
    performing a process to change the rotating speed when the rotating speed is less than or equal to the critical speed or equal to the predetermined maximum speed, and continuing recording data at the recording rate when the rotating speed is between the critical speed and the maximum speed.

2. The optical recording method according to claim 1, wherein the process for changing the rotating speed comprises:
    pausing recording data;
    registering a paused zone of a disc;
    determining a new rotating speed of the spindle motor, and driving the spindle motor at the new rotating speed; and
    continuing to record data at a new recording rate from the paused zone.

3. The optical recording method according to claim 2, wherein the step of determining the new rotating speed of the spindle motor comprises obtaining the new rotating speed from a look-up table according to the paused zone.

4. An optical recording method, comprising the steps of:
    recording data at a recording rate within a constant angle velocity (CAV) control mode;
    determining whether the control mode has to be changed to a constant linear velocity (CLV) control mode according to a recording rate or a recording position; and
    changing to the CLV control mode when the recording rate reaches a maximum recording rate, and continuing recording data at the constant angle velocity if the control mode does not change to the CLV control mode.

5. The optical recording method according to claim 4, wherein the process for changing the control mode comprises the steps of:
    pausing recording data;
    registering a paused zone of a disc;
    determining a new rotating speed of the spindle motor, and driving the spindle motor at the new rotating speed; and
    continuing to record data under a CLV control mode from the paused zone.

6. The optical recording method according to claim 5, wherein the recording rate is controlled with the CLV control mode when the recording rate reaches a maximum recording rate.

7. The optical recording method according to claim 5, wherein in the step of determining the new rotating speed of the spindle motor, a linear velocity at which data recording is used as the linear velocity of the CLV control mode.

8. The optical recording method according to claim 4, wherein a rotating speed of a spindle motor is constant in the CAV control mode.

9. The optical recording method according to claim 8, wherein the rotating speed is a maximum rotating speed in the CAV control mode.

10. The optical recording method according to claim 4, wherein the recording rate is constant in the CLV control mode.

11. The optical recording method according to claim 10, wherein, in the CLV control mode, the recording rate is the maximum recording rate.

12. The optical recording method according to claim 1, wherein the recording rate is constant.

13. The optical recording method according to claim 1, wherein the rotating speed is a first constant speed in a first position along a radius of an optical disk on which the data is recorded, and the rotating speed is a second constant speed in a second position along the radius of the optical disk.

14. The optical recording method according to claim 13, wherein the rotating speed is a third constant speed in a third position along the radius of the optical disk.

15. The optical recording method according to claim 14, wherein the rotating speed is a fourth constant speed in a fourth position along the radius of the optical disk.

16. The optical recording method according to claim 14, wherein the recording rate does not exceed a predetermined maximum recording rate.

17. The optical recording method according to claim 13, wherein the recording rate does not exceed a predetermined maximum recording rate.

18. The optical recording method according to claim 1, wherein the recording rate does not exceed a predetermined maximum recording rate.

* * * * *